US012812557B2

(12) United States Patent
Ren

(10) Patent No.: US 12,812,557 B2
(45) Date of Patent: Nov. 24, 2026

(54) SIGNAL TRANSMISSION POWER CONTROL METHOD AND APPARATUS

(71) Applicant: DATANG MOBILE COMMUNICATIONS EQUIPMENT CO., LTD., Beijing (CN)

(72) Inventor: Xiaotao Ren, Beijing (CN)

(73) Assignee: DATANG MOBILE EQUIPMENT CO., LTD., Beijing (CN)

(*) Notice: Subject to any disclaimer, the term of this patent is extended or adjusted under 35 U.S.C. 154(b) by 293 days.

(21) Appl. No.: 18/681,492

(22) PCT Filed: May 10, 2022

(86) PCT No.: PCT/CN2022/092025
§ 371 (c)(1),
(2) Date: Feb. 5, 2024

(87) PCT Pub. No.: WO2023/020032
PCT Pub. Date: Feb. 23, 2023

(65) Prior Publication Data
US 2024/0334344 A1 Oct. 3, 2024

(30) Foreign Application Priority Data
Aug. 16, 2021 (CN) ........................ 202110934629.3

(51) Int. Cl.
*H04W 52/24* (2009.01)

(52) U.S. Cl.
CPC ....... *H04W 52/246* (2013.01); *H04W 52/242* (2013.01)

(58) Field of Classification Search
CPC ............. H04W 52/246; H04W 52/242; H04W 52/10; H04W 52/343; H04W 52/367;
(Continued)

(56) References Cited

U.S. PATENT DOCUMENTS

2021/0045069 A1 2/2021 Akkarakaran et al.
2021/0068059 A1 * 3/2021 Yasukawa ............. H04W 52/36
2021/0080532 A1 3/2021 Mandelli et al.

FOREIGN PATENT DOCUMENTS

CN 110149689 A 8/2019
CN 111436036 A 7/2020
(Continued)

OTHER PUBLICATIONS

Office Action of Corresponding CN Patent Application No. 202110934629.3 Dated Jun. 28, 2025.
(Continued)

*Primary Examiner* — Curtis A Kuntz
(74) *Attorney, Agent, or Firm* — KILPATRICK TOWNSEND & STOCKTON LLP

(57) ABSTRACT

Disclosed in the present application are a signal transmission power control method and apparatus, which are used for realizing the control over transmission power of a sidelink positioning reference signal by means of a transmission power control parameter, to improve the positioning precision of a sidelink. The signal transmission power control method provided in the present disclosure comprises: determining a transmission power control parameter; and determining transmission power of a sidelink positioning reference signal (S-PRS) according to the transmission power control parameter.

4 Claims, 3 Drawing Sheets

(58) Field of Classification Search
CPC ............. H04W 52/325; H04W 52/383; H04W 72/04
See application file for complete search history.

(56) References Cited

FOREIGN PATENT DOCUMENTS

| | | | | | |
|---|---|---|---|---|---|
| CN | 112020131 | A | | 12/2020 | |
| CN | 112994858 | A | * | 6/2021 | H04W 4/44 |
| WO | WO-2017171895 | A1 | * | 10/2017 | H04L 1/0001 |
| WO | WO-2020032657 | A1 | * | 2/2020 | H04B 7/0426 |
| WO | WO-2020096693 | A1 | * | 5/2020 | H04W 53/383 |
| WO | 2021030583 | A1 | | 2/2021 | |
| WO | 2021034076 | A1 | | 2/2021 | |
| WO | WO-2021026567 | A1 | * | 2/2021 | H04W 52/46 |
| WO | 2021057232 | A1 | | 4/2021 | |
| WO | 2021086093 | A1 | | 5/2021 | |
| WO | WO-2021121058 | A1 | * | 6/2021 | H04L 5/0055 |
| WO | 2021156798 | A1 | | 8/2021 | |

OTHER PUBLICATIONS

European Patent Office, Extended European Search Report Issued in Application No. 22857349.9, Nov. 11, 2024, Germany, 8 pages.
3GPP TS 38.213 V16.3.0, 3rd Generation Partnership Project; Technical Specification Group Radio Access Network; NR;Physical layer procedures for control (Release 16), total 179 pages, Sep. 2020.
The second office action and search report issued in Chinese corresponding application 202110934629.3, mailed on Feb. 10, 2026.
The European Search Report received in the counterpart European Application 22857349.9, mailed on Feb. 17, 2026.
The Notice of Allowance issued in Chinese corresponding application 202110934629.3, mailed on Jun. 2, 2026.

* cited by examiner

SIGNAL TRANSMISSION POWER CONTROL METHOD AND APPARATUS

CROSS-REFERENCE TO RELATED APPLICATIONS

The present disclosure is a National Stage of International Application No. PCT/CN2022/092025, filed on May 10, 2022, which claims priority to Chinese Patent Application No. 202110934629.3, filed with the China National Intellectual Property Administration on Aug. 16, 2021 and entitled "Signal Transmission Power Control Method and Apparatus", the content of which is hereby incorporated by reference in its entirety.

FIELD

The resent disclosure relates to the field of communications, and in particular to a method and apparatus for controlling signal transmission power.

BACKGROUND

In a related New Radio Access (NR) positioning technology, a downlink positioning reference signal and an uplink positioning reference signal are only defined in an air interface between a base station and a terminal, and no sidelink positioning reference signal is defined in a PC5 interface between terminals. As a result, the terminal needs to rely on the base station to achieve positioning, and the positioning process cannot be completed in the sidelink.

Considering the requirement of sidelink positioning, it is necessary to introduce a sidelink positioning reference signal, and the terminal can directly complete the positioning process in the sidelink without relying on the base station.

As shown in FIG. 1, a terminal 1 sends a sidelink positioning reference signal to terminals 2 to 4, realizing a schematic diagram of the positioning process of the terminal 1. The terminal 1 may be referred to as a sending terminal or a transmitting terminal. The terminals 2 to 4 may be referred to as receiving terminals.

As shown in FIG. 1, the terminal 1 may send a Sidelink Positioning Reference Signal (S-PRS) to the terminals 2 to 4. After receiving the S-PRS, the terminals 2 to 4 measure the S-PRS and send measurement results to UE1, to assist UE1 to complete the positioning calculation.

However, if the terminal sends the sidelink positioning reference signal with a fixed power without controlling the S-PRS transmission power, when the sending terminal and the receiving terminal of the S-PRS are close to each other (as shown between the terminal 1 and the terminal 2 in FIG. 1), in this case, the sidelink path loss is very small, which may cause the S-PRS transmission power of the terminal to exceed the required power, causing serious mutual interference between S-PRSs between the terminals and affecting the positioning precision of the sidelink. On the other hand, when the sending terminal and the receiving terminal of the S-PRS are far away from each other (as shown between the terminal 1 and the terminal 3 in FIG. 1), in this case, the sidelink path loss is very large, which may cause the S-PRS transmission power of the terminal to fail to reach the required power, causing insufficient coverage of S-PRS and affecting the positioning precision of the sidelink.

SUMMARY

Embodiments of the present disclosure provides a method and apparatus for controlling signal transmission power, for realizing control of transmission power of a sidelink positioning reference signal through a transmission power control parameter, improving the positioning precision of the sidelink.

At a sending terminal side, a method for controlling signal transmission power according to an embodiment of the present disclosure includes:

determining a transmission power control parameter;

determining transmission power of a sidelink positioning reference signal, S-PRS, according to the transmission power control parameter.

Through the method, the transmission power control parameter is determined; the transmission power of the sidelink positioning reference signal, S-PRS, is determined according to the transmission power control parameter, the sending terminal sends the S-PRS to the receiving terminal using the transmission power, realizing the control of the transmission power of the sidelink positioning reference signal through the transmission power control parameter, and improving the positioning precision of the sidelink.

In one embodiment, the transmission power control parameter includes one or a combination of following parameters:

- a maximum transmission power of a sending terminal;
- a power control configuration parameter of the sidelink positioning reference signal;
- a partial path loss compensation factor of the sidelink positioning reference signal;
- a quantity of resource blocks occupied by the sidelink positioning reference signal;
- a sidelink path loss;
- a downlink path loss;
- an uplink path loss;
- a channel busy ratio;
- a transmission power of a physical sidelink shared channel.

In one embodiment, determining the transmission power of the S-PRS according to the transmission power control parameter, includes:

determining the transmission power $P_{S\text{-}PRS}(i)$ of the S-PRS in an S-PRS transmission occasion in slot i as:

$$P_{S\text{-}PRS}(i) = \min\left(P_{CMAX},\ P_{O,S\text{-}PRS} + 10\ \log_{10}\left(2^{\mu}\cdot M_{RB}^{S\text{-}PRS}\right) + \alpha_{S\text{-}PRS}\cdot PL\right)\ [\text{dBm}];$$

where:

$P_{CMAX}$ is a maximum transmission power of a sending terminal;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-ARB PRS;

$\alpha_{S\text{-}PRS}$ is a partial path loss compensation factor of the S-PRS;

PL is any one path loss of a sidelink path loss, a downlink path loss and an uplink path loss, or is a function value with at least one path loss of the sidelink path loss, the downlink path loss or the uplink path loss as an independent variable;

i is an integer greater than or equal to 0.

In one embodiment, determining the transmission power of the S-PRS according to the transmission power control parameter, includes:

determining the transmission power $P_{S\text{-}PRS}(i)$ of the S-PRS in an S-PRS transmission occasion in slot i as:

$$P_{S-PRS}(i) = \min\left(P_{CMAX}, P_{MAX,CBR}, P_{O,S-PRS} + 10\log_{10}\left(2^{\mu}\cdot M_{RB}^{S-PRS}\right) + \alpha_{S-PRS}\cdot PL\right)\ [\text{dBm}];$$

where:

$P_{CMAX}$ is a maximum transmission power of a sending terminal;

$P_{MAX,CBR}$ is a maximum transmission power of the sending terminal related to a channel busy ratio, CBR;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-ARB PRS;

$\alpha_{S\text{-}PRS}$ is a partial path loss compensation factor of the S-PRS;

PL is any one path loss of a sidelink path loss, a downlink path loss and an uplink path loss, or is a function value with at least one path loss of the sidelink path loss, the downlink path loss or the uplink path loss as an independent variable;

i is an integer greater than or equal to 0.

In one embodiment, determining the transmission power of the S-PRS according to the transmission power control parameter, includes:

determining the transmission power $P_{S\text{-}PRS}(i)$ of the S-PRS in an S-PRS transmission occasion in slot i as:

$$P_{S-PRS}(i) = \min(P_{CMAX}, \min(P_{S-PRS,D}(i), P_{S-PRS,SL}(i)))\ [\text{dBm}];$$

where:

$P_{CMAX}$ is a maximum transmission power of a sending terminal;

$P_{S\text{-}PRS,D}(i)$ is a transmission power of the S-PRS in an S-PRS transmission occasion in slot i determined by the sending terminal according to a downlink path loss;

$P_{S\text{-}PRS,SL}(i)$ is a transmission power of the S-PRS in an S-PRS transmission occasion in slot i determined by the sending terminal according to a sidelink path loss;

i is an integer greater than or equal to 0.

In one embodiment, determining the transmission power of the S-PRS according to the transmission power control parameter, includes:

determining the transmission power $P_{S\text{-}PRS}(i)$ of the S-PRS in an S-PRS transmission occasion in slot i as:

$$P_{S\text{-}PRS}(i)=\min(P_{CMAX},P_{MAX,CBR},\ \min(P_{S\text{-}PRS,D}(i), P_{S\text{-}PRS,SL}(i))[dBm];$$

where:

$P_{CMAX}$ is a maximum transmission power of a sending terminal;

$P_{MAX,CBR}$ is a maximum transmission power of the sending terminal related to a channel busy ratio, CBR;

$P_{S\text{-}PRS,D}(i)$ is a transmission power of the S-PRS in an S-PRS transmission occasion in slot i determined by the sending terminal according to a downlink path loss;

$P_{S\text{-}PRS,SL}(i)$ is a transmission power of the S-PRS in an S-PRS transmission occasion in slot i determined by the sending terminal according to a sidelink path loss;

i is an integer greater than or equal to 0.

In one embodiment, $P_{S\text{-}PRS,D}(i)$ is determined by:

$$P_{S-PRS,D}(i) = P_{O,D} + 10\log_{10}\left(2^{\mu}\cdot M_{RB}^{S-PRS}(i)\right) + \alpha_D\cdot PL_D\ [\text{dBm}];$$

where:

$P_{O,D}$ is a power control parameter $P_0$ related to downlink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_D$ is a partial path loss compensation factor related to downlink for the S-PRS;

$PL_D$ is a downlink path loss $PL_{DL}$;

i is an integer greater than or equal to 0.

In one embodiment, $P_{S\text{-}PRS,SL}(i)$ is determined by:

$$P_{S-PRS,SL}(i) = P_{O,SL} + 10\log_{10}\left(2^{\mu}\cdot M_{RB}^{S-PRS}(i)\right) + \alpha_{SL}\cdot PL_{SL}\ [\text{dBm}];$$

where:

$P_{O,SL}$ is a power control parameter $P_0$ related to sidelink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_{SL}$ is a partial path loss compensation factor related to sidelink for the S-PRS;

$PL_{SL}$ is a sidelink path loss;

i is an integer greater than or equal to 0.

In one embodiment, determining the transmission power of the S-PRS according to the transmission power control parameter, includes:

determining the transmission power $P_{S\text{-}PRS}(i)$ of the S-PRS in an S-PRS transmission occasion in slot i as:

$$P_{S-PRS}(i) = \min\left(P_{CMAX},\ 10\log_{10}\left(\frac{M_{RB}^{S-PRS}(i)}{M_{RB}^{PSSCH}(i)}\right) + P_{PSSCH}(i)\right)[dBm];$$

where:

$$M_{RB}^{S\text{-}PRS}(i)$$

is a quantity of resource blocks used for S-PRS transmission in an S-PRS transmission occasion i;

$$M_{RB}^{PSSCH}(i)$$

is a quantity of resource blocks used for physical sidelink shared channel, PSSCH, transmission in a PSSCH transmission occasion i;

$P_{PSSCH}(i)$ is transmission power $P_{PSSCH}$ of a sidelink data channel in a PSSCH transmission occasion i;

i is an integer greater than or equal to 0.

In one embodiment, the S-PRS and the physical sidelink share channel, PSSCH, are not sent on a same symbol.

In one embodiment, determining the transmission power of the S-PRS according to the transmission power control parameter, includes:

determining the transmission power $P_{S\text{-}PRS}$ (i) of the S-PRS in an S-PRS transmission occasion in slot i as:

$$P_{S-PRS}(i) = \min\left(P_{CMAX} - P_{PSSCH}(i),\ 10\log_{10}\left(\frac{M_{RB}^{S-PRS}(i)}{M_{RB}^{PSSCH}(i)}\right) + P_{PSSCH}(i)\right)[dBm];$$

where:

$$M_{RB}^{S\text{-}PRS}$$

is a quantity of resource blocks used for S-PRS transmission in an S-PRS transmission occasion i;

$$M_{RB}^{PSSCH}(i)$$

is a quantity of resource blocks used for PSSCH transmission in a PSSCH transmission occasion i;

$P_{PSSCH}(i)$ is transmission power $P_{PSSCH}$ of a sidelink data channel in a PSSCH transmission occasion i;

i is an integer greater than or equal to 0.

In one embodiment, the S-PRS and the physical sidelink share channel, PSSCH, are sent on a same symbol.

In one embodiment, the S-PRS is not sent on a symbol same as a symbol at which at least one of a physical sidelink control channel, PSCCH, or a physical sidelink feedback channel PSFCH is sent.

At a sending terminal side, an apparatus for controlling signal transmission power according to an embodiment of the present disclosure includes:

a memory, configured to store program instructions;

a processor, configured to invoke the program instructions stored in the memory, and perform followings according to an obtained program:

determining a transmission power control parameter;

determining transmission power of a sidelink positioning reference signal, S-PRS, according to the transmission power control parameter.

In one embodiment, the transmission power control parameter includes one or a combination of following parameters:

a maximum transmission power of a sending terminal;

a power control configuration parameter of the sidelink positioning reference signal;

a partial path loss compensation factor of the sidelink positioning reference signal;

a quantity of resource blocks occupied by the sidelink positioning reference signal;

a sidelink path loss;

a downlink path loss;

an uplink path loss;

a channel busy ratio;

a transmission power of a physical sidelink shared channel.

In one embodiment, the processor is configured to perform:

determining the transmission power $P_{S\text{-}PRS}(i)$ of the S-PRS in an S-PRS transmission occasion in slot i as:

$$P_{S-PRS}(i) = \min\left(P_{CMAX},\ P_{O,S-PRS} + 10\log_{10}\left(2^{\mu}\cdot M_{RB}^{S-PRS}\right) + \alpha_{S-PRS}\cdot PL\right)[dBm]$$

where:

$P_{CMAX}$ is a maximum transmission power of a sending terminal;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_{S\text{-}PRS}$ is a partial path loss compensation factor of the S-PRS;

PL is any one path loss of a sidelink path loss, a downlink path loss and an uplink path loss, or is a function value with at least one path loss of the sidelink path loss, the downlink path loss or the uplink path loss as an independent variable;

i is an integer greater than or equal to 0.

In one embodiment, the processor is configured to perform followings:

determining the transmission power $P_{S\text{-}PRS}(i)$ of the S-PRS in an S-PRS transmission occasion in slot i as:

$$P_{S-PRS}(i) = \min\left(P_{CMAX},\ P_{MAX,CBR},\ P_{O,S-PRS} + 10\log_{10}\left(2^{\mu}\cdot M_{RB}^{S-PRS}\right) + \alpha_{S-PRS}\cdot PL\right)$$

[dBm];

where:

$P_{CMAX}$ is a maximum transmission power of a sending terminal;

$P_{MAX,CBR}$ is a maximum transmission power of the sending terminal related to a channel busy ratio, CBR;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_{S\text{-}PRS}$ is a partial path loss compensation factor of the S-PRS;

PL is any one path loss of a sidelink path loss, a downlink path loss and an uplink path loss, or is a function value with at least one path loss of the sidelink path loss, the downlink path loss or the uplink path loss as an independent variable;

i is an integer greater than or equal to 0.

In one embodiment, the processor is configured to perform followings:

determining the transmission power $P_{S\text{-}PRS}(i)$ of the S-PRS in an S-PRS transmission occasion in slot i as:

$$P_{S\text{-}PRS}(i)=\min(P_{CMAX}, \min(P_{S\text{-}PRS,D}(i),P_{S\text{-}PRS,SL}(i))) [dBm];$$

where:

$P_{CMAX}$ is a maximum transmission power of a sending terminal;

$P_{S\text{-}PRS,D}(i)$ is a transmission power of the S-PRS in an S-PRS transmission occasion in slot i determined by the sending terminal according to a downlink path loss;

$P_{S\text{-}PRS,SL}(i)$ is a transmission power of the S-PRS in an S-PRS transmission occasion in slot i determined by the sending terminal according to a sidelink path loss;

i is an integer greater than or equal to 0.

In one embodiment, the processor is configured to perform followings:

determining the transmission power $P_{S\text{-}PRS}(i)$ of the S-PRS in an S-PRS transmission occasion in slot i as:

$$P_{S\text{-}PRS}(1)=\min(P_{CMAX},P_{MAX,CBR}, \min(P_{S\text{-}PRS,D}(i),P_{S\text{-}PRS,SL}(i))[dBm];$$

where:

$P_{CMAX}$ is a maximum transmission power of a sending terminal;

$P_{MAX,CBR}$ is a maximum transmission power of the sending terminal related to a channel busy ratio, CBR;

$P_{S\text{-}PRS,D}(i)$ is a transmission power of the S-PRS in an S-PRS transmission occasion in slot i determined by the sending terminal according to a downlink path loss;

$P_{S\text{-}PRS,SL}(i)$ is a transmission power of the S-PRS in an S-PRS transmission occasion in slot i determined by the sending terminal according to a sidelink path loss;

i is an integer greater than or equal to 0.

In one embodiment, the processor is configured to determine $P_{S\text{-}PRS,D}(i)$ by:

$$P_{S-PRS,D}(i) = P_{O,D} + 10\log_{10}\left(2^{\mu}\cdot M_{RB}^{S-PRS}(i)\right) + \alpha_D \cdot PL_D\ [dBm];$$

where:

$P_{O,D}$ is a power control parameter $P_0$ related to downlink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_D$ is a partial path loss compensation factor related to downlink for the S-PRS;

$PL_D$ is a downlink path loss $PL_{DL}$;

i is an integer greater than or equal to 0.

In one embodiment, the processor is configured to determine $P_{S\text{-}PRS,SL}(i)$ by:

$$P_{S-PRS,SL}(i) = P_{O,SL} + 10\log_{10}\left(2^{\mu}\cdot M_{RB}^{S-PRS}(i)\right) + \alpha_{SL} \cdot PL_{SL}\ [dBm];$$

where:

$P_{O,SL}$ is a power control parameter $P_0$ related to sidelink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{R}^{S\text{-}PRS}$$

is a quantity of resource blocks used by the sending terminal when sending the S-PRS;

$\alpha_{SL}$ is a partial path loss compensation factor related to sidelink for the S-PRS;

$PL_{SL}$ is a sidelink path loss;

i is an integer greater than or equal to 0.

In one embodiment, the processor is configured to perform followings:

determining the transmission power $P_{S\text{-}PRS}(i)$ of the S-PRS in an S-PRS transmission occasion in slot i as:

$$P_{S-PRS}(i) = \min\left(P_{CMAX},\ 10\log_{10}\left(\frac{M_{RB}^{S-PRS}(i)}{M_{RB}^{PSSCH}(i)}\right) + P_{PSSCH}(i)\right)[dBm];$$

where:

$$M_{RB}^{S\text{-}PRS}(i)$$

is a quantity of resource blocks used for S-PRS transmission in an S-PRS transmission occasion i;

$$M_{RB}^{PSSCH}(i)$$

is a quantity of resource blocks used for physical sidelink shared channel, PSSCH, transmission in a PSSCH transmission occasion i;

$P_{PSSCH}(i)$ is transmission power $P_{PSSCH}$ of a sidelink data channel in a PSSCH transmission occasion i;

i is an integer greater than or equal to 0.

In one embodiment, the S-PRS and the physical sidelink share channel, PSSCH, are not sent on a same symbol.

In one embodiment, the processor is configured to perform followings:

determining the transmission power $P_{S\text{-}PRS}(i)$ of the S-PRS in an S-PRS transmission occasion in slot i as:

$$P_{S\text{-}PRS}(i) = \min\left(P_{CMAX} - P_{PSSCH}(i),\ 10\log_{10}\left(\frac{M_{RB}^{S\text{-}PRS}(i)}{M_{RB}^{PSSCH}(i)}\right) + P_{PSSCH}(i)\right)[dBm];$$

where:

$$M_{RB}^{S\text{-}PRS}(i)$$

is a quantity of resource blocks used for S-PRS transmission in an S-PRS transmission occasion i;

$$M_{RB}^{PSSCH}(i)$$

is a quantity of resource blocks used for PSSCH transmission in a PSSCH transmission occasion i;

$P_{PSSCH}(i)$ is transmission power $P_{PSSCH}$ of a sidelink data channel in a PSSCH transmission occasion i;

i is an integer greater than or equal to 0.

In one embodiment, the S-PRS and the physical sidelink share channel, PSSCH, are sent on a same symbol.

In one embodiment, the S-PRS is not sent on a symbol same as a symbol at which at least one of a physical sidelink control channel, PSCCH, or a physical sidelink feedback channel PSFCH is sent.

At a sending terminal side, another apparatus for controlling signal transmission power according to an embodiment of the present disclosure includes:

a first device, configured to determine transmission power control parameter;

a second device, configured to determine transmission power of a sidelink positioning reference signal, S-PRS, according to the transmission power control parameter.

Another embodiment of that present disclosure provides a computing device including a memory and a processor, where the memory is configured to store program instructions, and the processor is configured to invoke the program instructions stored in the memory, and perform any one of the above methods according to an obtained program.

Another embodiment of that present disclosure provides a computer storage medium, storing computer-executable instruction thereon, the computer-executable instructions being configured to cause a computer to perform any one of the above methods.

BRIEF DESCRIPTION OF FIGURES

In order to illustrate the embodiments of the present disclosure more clearly, accompanying drawings that need to be used in describing embodiments will be introduced below briefly. The accompanying drawings described below are only some embodiments of the present disclosure.

DETAILED DESCRIPTION

Figure 1:
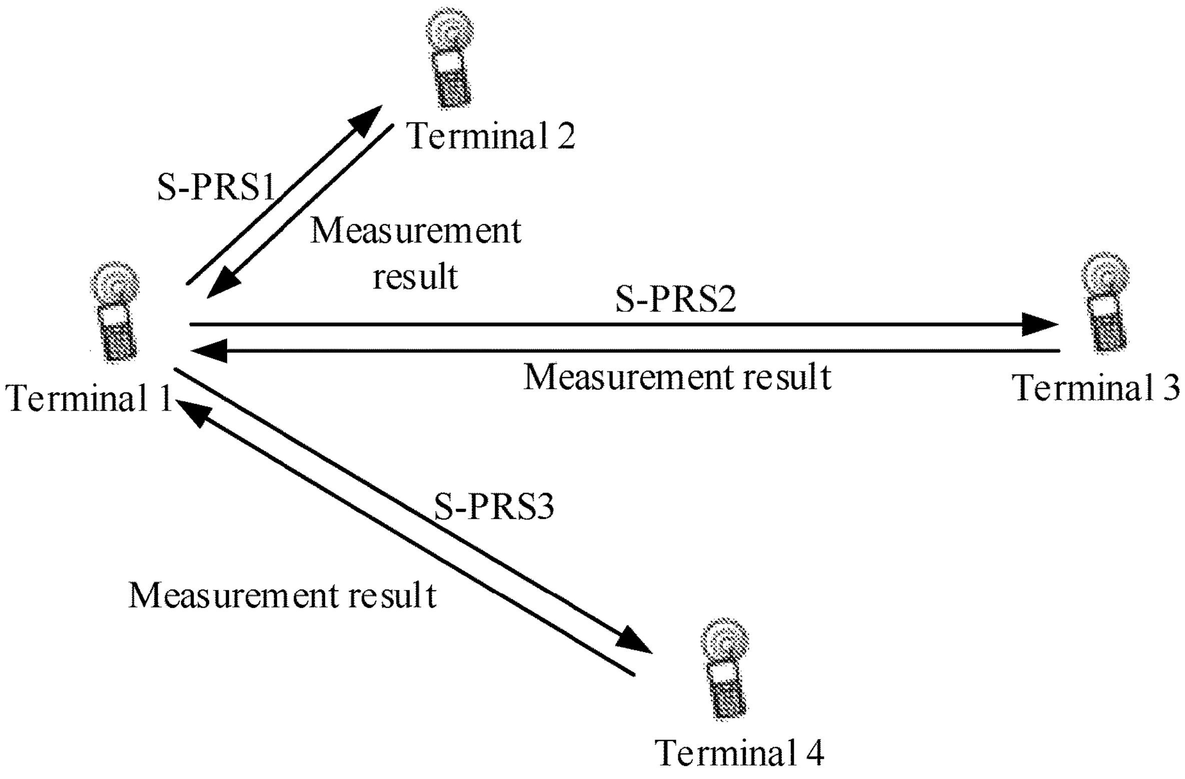
FIG. 1 is a schematic diagram of transmitting a sidelink positioning reference signal according to an embodiment of the present disclosure.

Embodiments of the present disclosure will be clearly and completely described below in conjunction with accompanying drawings in embodiments of the present disclosure. Apparently, embodiments described are some rather than all of embodiments of the present disclosure. Based on embodiments of the present disclosure.

Embodiments of the present disclosure provide a method and apparatus for controlling signal transmission power, for realizing the control of the transmission power of the sidelink positioning reference signal through the transmission power control parameter, improving the positioning precision of the sidelink.

The method and the apparatus are based on the same inventive conception. Since principles of the method and the apparatus for solving problems are similar, implementations of the apparatus and the method may refer to each other, and repetitions are omitted.

Embodiments of the present disclosure may be applied to various systems, especially 5G systems. For example, applicable systems may be a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, a LTE time division duplex (TDD), an universal mobile telecommunication system (UMTS), a worldwide interoperability for microwave access (WiMAX) system, a 5G system and a 5G NR system, etc. The various systems each include a terminal device and a network device.

The terminal device involved in embodiments of the present disclosure may be referred to a device that provides voice and/or data connectivity to users, a handheld device with a wireless connection function, or other processing device connected to a wireless modem. In different systems, names of the terminal device may be different. For example, in the 5G system, the terminal device may be called user equipment (UE). The wireless terminal device may communicate with one or more core networks via a RAN, and the wireless terminal device may be a mobile terminal device and a mobile phone (or referred to a "cellular" phone) and a computer with a mobile terminal device, for example, which may be portable, pocket, handheld, computer built-in or vehicle mounted mobile devices that exchange language and/or data with a radio access network. For example, a personal communication service (PCS) phone, a cordless phones, a session initiated protocol (SIP) phone, a wireless local loop (WLL) station, a personal digital assistant (PDA) and other devices. The wireless terminal device may also be referred to as a system, a subscriber unit, a subscriber station, a mobile station, a mobile, a remote station, an access point, a remote terminal, an access terminal, a user terminal, a user agent, and a user device, which are not limited in embodiments of the present disclosure.

The network device involved in embodiments of the present disclosure may be a base station, and the base station may include a plurality of cells. Depending on the specific application, the base station may also be referred to as an access point, or may refer to a device that communicates with the wireless terminal device through one or more sectors on an air interface in the access network, or other names. The network device may be configured to interconvert received air frames and internet protocol (IP) packets, and act as a router between the wireless terminal device and the rest of the access network, where the rest of the access network may include an internet protocol (IP) communication network. The network device may also coordinate attribute management for the air interface. For example, the network device involved in embodiments of the present disclosure may be a base transceiver station (BTS) in a global system for mobile communications (GSM) or a code division multiple access (CDMA), or a network device (NodeB) in wide-band code division multiple access (WCDMA), or an evolutional node B (eNB or e-NodeB) in a long term evolution (LTE) system, or a 5G base station in 5G network architecture (a next generation system), a home evolved node B (HeNB), relay node (relay node), a home base station (femto), a pico base station (pico), etc., which are not limited in embodiments of the present disclosure.

Various embodiments of the present disclosure will be described in detail below with reference to the accompanying drawings. It should be noted that the display order of embodiments of the present disclosure only represents the sequence of embodiments, and does not represent advantages and disadvantages of embodiments.

Embodiments of the present disclosure provide a power control scheme for a sidelink positioning reference signal of a terminal suitable for sidelink, the sending terminal can determine the transmission power of the sidelink positioning reference signal, S-PRS, according to the transmission power control parameter, and sends the S-PRS to the receiving terminal using the transmission power.

The transmission power control parameter includes one or more pieces of information of, for example, maximum transmission power $P_{CMAX}$ of a sending terminal, a power control configuration parameter $P_0$ of the sidelink positioning reference signal, a partial path loss compensation factor α of the sidelink positioning reference signal, a quantity M of resource blocks occupied by the sidelink positioning reference signal, a sidelink path loss $PL_{SL}$, a downlink path loss $PL_{DL}$, an uplink path loss $PL_{UL}$, a channel busy ratio CBR, transmission power $P_{PSSCH}$ of a physical sidelink shared channel, or the like. The transmission power $P_{S\text{-}PRS}$ of the sidelink positioning reference signal is determined using one or more of these pieces of information.

Embodiments of the present disclosure use the method to ensure that the terminal can determine the appropriate transmission power of the sidelink positioning reference signal, reducing the mutual interference between the sidelink positioning reference signals sent between the terminals, improving the positioning precision of the sidelink by the terminal.

Figure 2:
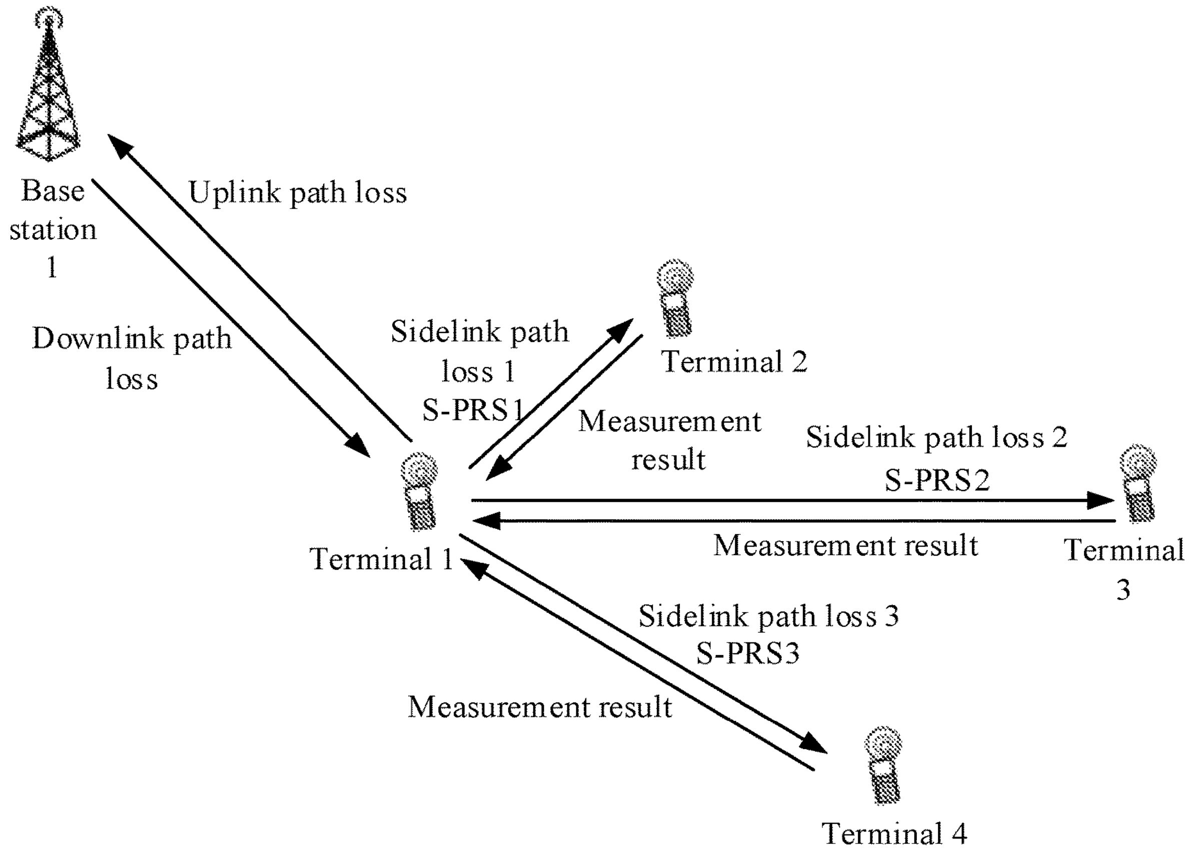
FIG. 2 is a schematic diagram of a sidelink positioning reference signal power control scheme according to an embodiment of the present disclosure.

As shown in FIG. 2, if the terminal controls the transmission power of the S-PRS according to various power control parameters, when the sending terminal and the receiving terminal of the S-PRS are close to each other (as shown between the terminal 1 and the terminal 2 in FIG. 1), in this case, the sidelink path loss is very small, and the terminal uses a small S-PRS transmission power, avoiding the serious mutual interference between S-PRSs between the terminals, and further ensuring the high positioning precision of the sidelink. On the other hand, when the sending terminal and the receiving terminal of the S-PRS are far away from each other (as shown between the terminal 1 and the terminal 3 in FIG. 1), in this case, the sidelink path loss is very large, and the terminal uses a large S-PRS transmission power, ensuring the coverage of the S-PRS and the high positioning precision of the sidelink. When the terminal calculates the transmission power of the S-PRS, the downlink path loss or the uplink path loss with the base station may also be considered simultaneously, avoiding the influence on the air interface communication between the base station and the terminal when the terminal transmits the S-PRS. The above three types of path losses are defined as follows.

The sidelink path loss $PL_{SL}$ refers to the sidelink path loss between the S-PRS sending terminal and the S-PRS receiving terminal.

The downlink path loss $PL_{DL}$ refers to the air interface downlink path loss from a base station or a cell to the S-PRS sending terminal.

The uplink path loss $PL_{UL}$ refers to the air interface downlink path loss from the S-PRS sending terminal to a base station or a cell.

The specific power control schemes for the S-PRS are as follows.

1. S-PRS power control scheme 1 (single path loss determination method+no CBR) is as follows.

A sending terminal determines transmission power $P_{S\text{-}PRS}(i)$ of the S-PRS in an S-PRS transmission occasion in slot i (i is an integer greater than or equal to 0) as:

$$P_{S\text{-}PRS}(i) = \min\left(P_{CMAX},\ P_{O,S\text{-}PRS} + 10\log_{10}\left(2^{\mu}\cdot M_{RB}^{S\text{-}PRS}\right) + \alpha_{S\text{-}PRS}\cdot PL\right)\ [dBm];$$

where:

$P_{CMAX}$ is maximum transmission power of the sending terminal;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_{S\text{-}PRS}$ is a partial path loss compensation factor of the S-PRS; this factor is optional and may not be configured, that is, when this option is not configured, it indicates complete path loss compensation.

The complete path loss compensation means that when calculating the S-PRS transmission power, a value of all path losses is compensated to the transmission power according to the path loss between the S-PRS sending end and the S-PRS receiving end. For example, if the path loss is 100 dB, the transmission power should be increased by 100 dB accordingly, instead of a value less than 100 dB.

Taking the following formula as an example, the complete path loss compensation refers to $\alpha_{S\text{-}PRS}=1$ or no such factor of $\alpha_{S\text{-}PRS}$. The partial path loss compensation refers to $0<\alpha_{S\text{-}PRS}<1$;

$$P_{S-PRS}(i) = \min\left(P_{CMAX}, P_{O,S-PRS} + 10\log_{10}\left(2^{\mu}\cdot M_{RB}^{S-PRS}\right) + \alpha_{S-PRS}\cdot PL\right)\ [dBm].$$

PL is any one path loss of a sidelink path loss, a downlink path loss and an uplink path loss, or is a function value with at least one path loss of the sidelink path loss, the downlink path loss or the uplink path loss as an independent variable.

2. S-PRS power control scheme 2 (single path loss determination method+with CBR) is as follows.

A sending terminal determines transmission power $P_{S\text{-}PRS}$ (i) of the S-PRS in an S-PRS transmission occasion in slot i (i is an integer greater than or equal to 0) as:

$$P_{S-PRS}(i) = \min\left(P_{CMAX}, P_{MAX,CBR}, P_{O,S-PRS} + 10\log_{10}\left(2^{\mu}\cdot M_{RB}^{S-PRS}\right) + \alpha_{S-PRS}\cdot PL\right)\ [dBm];$$

where:

$P_{CMAX}$ is maximum transmission power of the sending terminal;

$P_{MAX,CBR}$ is the maximum transmission power of the sending terminal related to a channel busy ratio (CBR);

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S-PRS}$$

is a quantity of resource blocks used by the sending terminal when sending the S-PRS;

$\alpha_{S\text{-}PRS}$ is a partial path loss compensation factor of the S-PRS; this factor is optional and may not be configured, that is, when this option is not configured, it indicates complete path loss compensation; PL is any one path loss of a sidelink path loss, a downlink path loss and an uplink path loss, or is a function value with at least one path loss of the sidelink path loss, the downlink path loss or the uplink path loss as an independent variable.

3. S-PRS power control scheme 3 (dual path loss determination method+no CBR) is as follows.

A sending terminal determines transmission power $P_{S\text{-}PRS}$ (i) of the S-PRS in an S-PRS transmission occasion in slot i (i is an integer greater than or equal to 0) as:

$$P_{S\text{-}PRS}(i)=\min(P_{CMAX}, \min(P_{S\text{-}PRS,D}(i),P_{S\text{-}PRS,SL}(i)))\ [dBm];$$

where:

$P_{CMAX}$ is maximum transmission power of the sending terminal;

$P_{S\text{-}PRS,D}$(i) is the transmission power of the S-PRS in an S-PRS transmission occasion in slot i determined by the sending terminal according to a downlink path loss;

$P_{S\text{-}PRS,SL}$(i) is the transmission power of the S-PRS in an S-PRS transmission occasion in slot i determined by the sending terminal according to a sidelink path loss.

4. S-PRS power control scheme 4 (dual path loss determination method+with CBR) is as follows.

A sending terminal determines transmission power $P_{S\text{-}PRS}$ (i) of the S-PRS in an S-PRS transmission occasion in slot i (i is an integer greater than or equal to 0) as:

$$P_{S\text{-}PRS}(1)=\min(P_{CMAX},P_{MAX,CBR}, \min(P_{S\text{-}PRS,D}(i), P_{S\text{-}PRS,SL}(i)))[dBm];$$

where:

$P_{CMAX}$ is maximum transmission power of the sending terminal;

$P_{MAX,CBR}$ is the maximum transmission power of the sending terminal related to a channel busy ratio (CBR);

$P_{S\text{-}PRS,D}$(i) is the transmission power of the S-PRS in an S-PRS transmission occasion in slot i determined by the sending terminal according to a downlink path loss;

$P_{S\text{-}PRS,SL}$(i) is the transmission power of the S-PRS in an S-PRS transmission occasion in slot i determined by the sending terminal according to a sidelink path loss.

5. S-PRS power control scheme 5 (data channel determination method+different symbol transmission) is as follows.

A sending terminal determines transmission power $P_{S\text{-}PRS}$ (i) of the S-PRS in an S-PRS transmission occasion in slot i (i is an integer greater than or equal to 0) as:

$$P_{S-PRS}(i) = \min\left(P_{CMAX}, 10\log_{10}\left(\frac{M_{RB}^{S-PRS}(i)}{M_{RB}^{PSSCH}(i)}\right) + P_{PSSCH}(i)\right)[dBm];$$

where:

$$M_{RB}^{S-PRS}(i)$$

is a quantity of resource blocks used for S-PRS transmission in an S-PRS transmission occasion i;

$$M_{RB}^{PSSCH}(i)$$

is a quantity of resource blocks used for physical sidelink shared channel (PSSCH) transmission in a PSSCH transmission occasion i;

$P_{PSSCH}$(i) is transmission power $P_{PSSCH}$ of a sidelink data channel in a PSSCH transmission occasion i.

6. S-PRS power control scheme 6 (data channel determination method+same symbol transmission) is as follows.

Applicable scenario: simultaneous transmission of S-PRS and PSSCH.

A sending terminal determines transmission power $P_{S\text{-}PRS}(i)$ of the S-PRS in an S-PRS transmission occasion in slot i (i is an integer greater than or equal to 0) as:

$$P_{S-PRS}(i) = \min\left(P_{CMAX} - P_{PSSCH}(i),\ 10\log_{10}\left(\frac{M_{RB}^{S-PRS}(i)}{M_{RB}^{PSSCH}(i)}\right) + P_{PSSCH}(i)\right)[dBm];$$

where:

$$M_{RB}^{S-PRS}(i)$$

is a quantity of resource blocks used for S-PRS transmission in an S-PRS transmission occasion i;

$$M_{RB}^{PSSCH}(i)$$

is a quantity of resource blocks used for PSSCH transmission in a PSSCH transmission occasion i;

$P_{PSSCH}(i)$ is transmission power $P_{PSSCH}$ of a sidelink data channel in a PSSCH transmission occasion i.

It should be noted that in embodiments of the present disclosure, i is any integer greater than or equal to 0, values of i described in different positions in the description may be different.

7. Multiplexing scheme of S-PRS and PSSCH/PSCCH/PSFCH is as follows.

A sending terminal selects and uses a suitable S-PRS power control scheme according to the multiplexing condition of the same symbol of the S-PRS and the PSSCH.

When the S-PRS and the PSSCH are not sent on the same symbol, the sending terminal uses the above S-PRS power control schemes 1 to 5, to perform transmission power control on the S-PRS.

When the S-PRS and the PSSCH are sent on the same symbol, the sending terminal uses the above S-PRS power control scheme 6, to perform transmission power control on the S-PRS.

To avoid the effect of the S-PRS on the sidelink control channel, the S-PRS is not sent on the same symbol as at least one channel of Physical Sidelink Control Channel (PSCCH) or Physical Sidelink Feedback Channel (PSFCH).

Illustrations of several specific embodiments are given below.

Embodiment 1 (S-PRS power control scheme 1 (single path loss determination method+no CBR)) is as follows.

Transmission power $P_{S\text{-}PRS}$ of a sidelink positioning reference signal is determined according to information and maximum transmission power $P_{CMAX}$ of a sending terminal, a power control configuration parameter $P_0$ of the sidelink positioning reference signal, a partial path loss compensation factor α of the sidelink positioning reference signal, a quantity M of resource blocks occupied by the sidelink positioning reference signal, a sidelink path loss $PL_{SL}$, a downlink path loss $PL_{DL}$, an uplink path loss $PL_{UL}$, or the like. The sending terminal sends the sidelink positioning reference signal (S-PRS) with the determined transmission power $P_{S\text{-}PRS}$.

The sending terminal determines the transmission power $P_{S\text{-}PRS}(i)$ of the S-PRS in an S-PRS transmission occasion in slot i (i is an integer greater than or equal to 0) as:

$$P_{S-PRS}(i) = \min\left(P_{CMAX},\ P_{O,S-PRS} + 10\log_{10}\left(2^{\mu}\cdot M_{RB}^{S-PRS}\right) + \alpha_{S-PRS}\cdot PL\right)[dBm];$$

where:

$P_{CMAX}$ is maximum transmission power of the sending terminal;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S-PRS}$$

is a quantity of resource blocks used by the sending terminal when sending the S-PRS;

$\alpha_{S\text{-}PRS}$ is a partial path loss compensation factor of the S-PRS;

PL is any one path loss of a sidelink path loss $PL_{SL}$, a downlink path loss $PL_{DL}$, and an uplink path loss $PL_{UL}$, or any combination of a plurality of path losses.

When the sending terminal calculates the transmission power of the S-PRS according to the above parameters, the above parameters (except PL) can be obtained by means of pre-configuration or higher-layer signaling configuration. If $P_{O,S\text{-}PRS}$ is not preconfigured or configured by higher layer signaling, then $P_{S\text{-}PRS}(i)=P_{CMAX}$. If $\alpha_{S\text{-}PRS}$ is not preconfigured or configured by higher layer signaling, then $\alpha_{S\text{-}PRS}=1$.

The PL in the above formula is any one path loss of a sidelink path loss, a downlink path loss and an uplink path loss, or is a function value with at least one path loss of the sidelink path loss, the downlink path loss or the uplink path loss as an independent variable. Any combination of a plurality of path losses means that a certain mixed path loss is calculated with at least one of path loss the sidelink path loss $PL_{SL}$, the downlink path loss $PL_{DL}$, or the uplink path loss $PL_{UL}$ as parameters. For example, PL=min ($PL_{SL}$, $PL_{DL}$, $PL_{UL}$), PL=max ($PL_{SL}$, $PL_{DL}$, $PL_{UL}$), PL=mean ($PL_{SL}$, $PL_{DL}$, $PL_{UL}$).

By adopting the power control method for the sidelink positioning reference signal in this embodiment, the terminal can flexibly determine the appropriate transmission power of the sidelink positioning reference signal according to respective parameters of the wireless transmission and the mixed path loss, reducing the mutual interference between the sidelink positioning reference signals sent between the terminals, and improving the positioning precision of the sidelink by the terminal.

Embodiment 2 (S-PRS power control scheme 2 (single path loss determination method+with CBR)) is as follows.

Transmission power $P_{S\text{-}PRS}$ of a sidelink positioning reference signal is determined according to information and maximum transmission power $P_{CMAX}$ of a sending terminal, a power control configuration parameter $P_0$ of the sidelink positioning reference signal, a partial path loss compensation factor α of the sidelink positioning reference signal, a quantity M of resource blocks occupied by the sidelink positioning reference signal, a sidelink path loss $PL_{SL}$, a downlink path loss $PL_{DL}$, an uplink path loss $PL_{UL}$, a channel busy ratio CBR, or the like. The sending terminal sends the sidelink positioning reference signal (S-PRS) with the determined transmission power $P_{S\text{-}PRS}$.

The sending terminal determines the transmission power $P_{S\text{-}PRS}(i)$ of the S-PRS in an S-PRS transmission occasion in slot i (i is an integer greater than or equal to 0) as:

$$P_{S-PRS}(i) = \min\big(P_{CMAX}, P_{MAX,CBR}, P_{O,S-PRS} + 10\log_{10}\big(2^{\mu}\cdot M_{RB}^{S-PRS}\big) + \alpha_{S-PRS}\cdot PL\big)\ [dBm];$$

where:

$P_{CMAX}$ is maximum transmission power of the sending terminal;

$P_{MAX,CBR}$ is the maximum transmission power of the sending terminal related to a channel busy ratio (CBR);

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S-PRS}$$

is a quantity of resource blocks used by the sending terminal when sending the S-PRS;

$\alpha_{S\text{-}PRS}$ is a partial path loss compensation factor of the S-PRS;

PL is any one path loss of a sidelink path loss $PL_{SL}$, a downlink path loss $PL_{DL}$, and an uplink path loss $PL_{UL}$, or any combination of a plurality of path losses.

When the sending terminal calculates the transmission power of the S-PRS according to the above parameters, the above parameters (except PL) can be obtained by means of pre-configuration or higher-layer signaling configuration. If $P_{O,S\text{-}PRS}$ is not preconfigured or configured by higher layer signaling, then $P_{S\text{-}PRS}$ (i)=$P_{CMAX}$. If $\alpha_{S\text{-}PRS}$ is not preconfigured or configured by higher layer signaling, then $\alpha_{S\text{-}PRS}=1$.

In addition, the parameter CBR refers to a channel occupation ratio in a resource pool in a historical time window measured by the terminal, and is a characterization parameter of a congestion degree of a current resource pool. Different CBR value intervals correspond to different maximum transmission powers of the terminal. For example, a corresponding relationship between CBR and $P_{MAX,CBR}$ is shown in the following table:

| Serial number | Maximum transmission power $P_{MAX,\ CBR}$ of the terminal | CBR interval | CBR maximum transmission power $P_{MAX,\ CBR}$ of the terminal |
|---|---|---|---|
| 1 | 23 dBm | [CBR < 0.5] | 23 dBm |
| 2 | 23 dBm | [0.5 < CBR < 0.6] | 22 dBm |
| 3 | 23 dBm | [0.6 < CBR < 0.7] | 21 dBm |
| 4 | 23 dBm | [0.7 < CBR < 0.8] | 19 dBm |
| 5 | 23 dBm | [0.8 < CBR < 0.9] | 17 dBm |
| 6 | 23 dBm | [CBR > 0.9] | 15 dBm |

The PL in the above formula is any one path loss of a sidelink path loss, a downlink path loss and an uplink path loss, or is a function value with at least one path loss of the sidelink path loss, the downlink path loss or the uplink path loss as an independent variable. Any combination of a plurality of path losses means that a certain mixed path loss is calculated with at least one of path loss the sidelink path loss $PL_{SL}$, the downlink path loss $PL_{DL}$, or the uplink path loss $PL_{UL}$ as parameters. For example, PL=min ($PL_{SL}$, $PL_{DL}$, $PL_{UL}$).

By adopting the power control method for the sidelink positioning reference signal in this embodiment, the terminal can flexibly determine the appropriate transmission power of the sidelink positioning reference signal according to respective parameters of the wireless transmission, CBR and the mixed path loss, reducing the mutual interference between the sidelink positioning reference signals sent between the terminals, and improving the positioning precision of the sidelink by the terminal.

Embodiment 3 (S-PRS power control scheme 3 (dual path loss determination method+no CBR)) is as follows.

Transmission power $P_{S\text{-}PRS}$ of a sidelink positioning reference signal is determined according to information and maximum transmission power $P_{CMAX}$ of a sending terminal, a power control configuration parameter $P_0$ of the sidelink positioning reference signal, a partial path loss compensation factor α of the sidelink positioning reference signal, a quantity M of resource blocks occupied by the sidelink positioning reference signal, a sidelink path loss $PL_{SL}$, a downlink path loss $PL_{DL}$, an uplink path loss $PL_{UL}$, or the like. The sending terminal sends the sidelink positioning reference signal (S-PRS) with the determined transmission power $P_{S\text{-}PRS}$.

The sending terminal determines the transmission power $P_{S\text{-}PRS}(i)$ of the S-PRS in an S-PRS transmission occasion in slot i (i is an integer greater than or equal to 0) as:

$$P_{S-PRS}(i)=\min(P_{CMAX}, \min(P_{S-PRS,D}(i),P_{S-PRS,SL}(i))\ [dBm];$$

where:

$P_{CMAX}$ is maximum transmission power of the sending terminal;

$P_{S\text{-}PRS,D}(i)$ is the transmission power of the S-PRS in an S-PRS transmission occasion in slot i determined by the sending terminal according to a downlink path loss;

$P_{S\text{-}PRS,SL}(i)$ is the transmission power of the S-PRS in an S-PRS transmission occasion in slot i determined by the sending terminal according to a sidelink path loss.

In particular, the S-PRS power control scheme described in this embodiment is to first calculate the transmission power $P_{S\text{-}PRS,D}(i)$ and $P_{S\text{-}PRS,SL}(i)$ of the S-PRS according to the downlink path loss and the sidelink path loss respectively, and then calculate the final transmission power of the S-PRS according to the above formula.

$P_{S\text{-}PRS,D}(i)$ and $P_{S\text{-}PRS,SL}(i)$ are calculated as follows.

$$P_{S-PRS,D}(i) = P_{O,D} + 10\log_{10}\big(2^{\mu}\cdot M_{RB}^{S-PRS}(i)\big) + \alpha_D\cdot PL_D\ [\text{dBm}];$$

where:

$P_{O,D}$ is a power control parameter $P_0$ related to downlink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S-PRS}$$

is a quantity of resource blocks used by the sending terminal when sending the S-PRS;

$\alpha_D$ is a partial path loss compensation factor related to downlink for the S-PRS;

$PL_D$ is a downlink path loss $PL_{DL}$.

$$P_{S-PRS,SL}(i) = P_{O,SL} + 10\log_{10}\left(2^{\mu} \cdot M_{RB}^{S-PRS}(i)\right) + \alpha_{SL} \cdot PL_{SL} \text{ [dBm]};$$

where:

$P_{O,SL}$ is a power control parameter $P_0$ related to sidelink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S-PRS}$$

is a quantity of resource blocks used by the sending terminal when sending the S-PRS;

$\alpha_{SL}$ is a partial path loss compensation factor related to sidelink for the S-PRS;

$PL_{SL}$ is a sidelink path loss.

In addition, when the sending terminal calculates the transmission power of the S-PRS according to the above parameters, the above parameters (except PL) can be obtained by means of pre-configuration or higher-layer signaling configuration. If $P_{S-PRS,D}$(i) is not preconfigured or configured by higher layer signaling, then $P_{S-PRS,D}$(i)=$P_{CMAX}$. If $P_{S-PRS,SL}$(i) is not preconfigured or configured by higher layer signaling, then $P_{S-PRS,SL}$(i)=$P_{CMAX}$. If $\alpha_D$ is not preconfigured or configured by higher layer signaling, then $\alpha_D$=1. If $\alpha_{SL}$ is not preconfigured or configured by higher layer signaling, then $\alpha_{SL}$=1.

By adopting the power control method for the sidelink positioning reference signal in this embodiment, the terminal can flexibly determine the appropriate transmission power of the sidelink positioning reference signal according to respective parameters of the wireless transmission, and the downlink path loss/sidelink path loss, reducing the mutual interference between the sidelink positioning reference signals sent between the terminals, and improving the positioning precision of the sidelink by the terminal.

Embodiment 4 (S-PRS power control scheme 4 (dual path loss determination method+with CBR)) is as follows.

Transmission power $P_{S-PRS}$ of a sidelink positioning reference signal is determined according to information and maximum transmission power $P_{CMAX}$ of a sending terminal, a power control configuration parameter $P_0$ of the sidelink positioning reference signal, a partial path loss compensation factor α of the sidelink positioning reference signal, a quantity M of resource blocks occupied by the sidelink positioning reference signal, a sidelink path loss $PL_{SL}$, a downlink path loss $PL_{DL}$, an uplink path loss $PL_{UL}$, a channel busy ratio (CBR), or the like. The sending terminal sends the sidelink positioning reference signal (S-PRS) with the determined transmission power $P_{S-PRS}$.

The sending terminal determines the transmission power $P_{S-PRS}$(i) of the S-PRS in an S-PRS transmission occasion in slot i (i is an integer greater than or equal to 0) as:

$$P_{S-PRS}(1)=\min(P_{CMAX},P_{MAX},CBR, \min(P_{S-PRS,D}(i), P_{S-PRS,SL}(i))[dBm];$$

where:

$P_{CMAX}$ is maximum transmission power of the sending terminal;

$P_{MAX,CBR}$ is the maximum transmission power of the sending terminal related to a channel busy ratio (CBR);

$P_{S-PRS,D}$(i) is the transmission power of the S-PRS in an S-PRS transmission occasion in slot i determined by the sending terminal according to a downlink path loss;

$P_{S-PRS,SL}$(i) is the transmission power of the S-PRS in an S-PRS transmission occasion in slot i determined by the sending terminal according to a sidelink path loss.

In particular, the S-PRS power control scheme described in this embodiment is to first calculate the transmission power $P_{S-PRS,D}$(i) and $P_{S-PRS,SL}$(i) of the S-PRS according to the downlink path loss and the sidelink path loss respectively, and then calculate the final transmission power of the S-PRS according to the above formula.

$P_{S-PRS,D}$(i) and $P_{S-PRS,SL}$(i) are calculated as follows.

$$P_{S-PRS,D}(i) = P_{O,D} + 10\log_{10}\left(2^{\mu} \cdot M_{RB}^{S-PRS}(i)\right) + \alpha_D \cdot PL_D \text{ [dBm]};$$

where.

$P_{O,D}$ is a power control parameter $P_0$ related to downlink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S-PRS}$$

is a quantity of resource blocks used by the sending terminal when sending the S-PRS;

$\alpha_D$ is a partial path loss compensation factor related to downlink for the S-PRS;

$PL_D$ is a downlink path loss $PL_{DL}$ $$P_{S-PRS,SL}(i) = P_{O,SL} + 10\log_{10}\left(2^{\mu} \cdot M_{RB}^{S-PRS}(i)\right) + \alpha_{SL} \cdot PL_{SL} \text{ [dBm]};$$

where:

$P_{O,SL}$ is a power control parameter $P_0$ related to sidelink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S-PRS}$$

is a quantity of resource blocks used by the sending terminal when sending the S-PRS;

$\alpha_{SL}$ is a partial path loss compensation factor related to sidelink for the S-PRS;

$PL_{SL}$ is a sidelink path loss.

In addition, when the sending terminal calculates the transmission power of the S-PRS according to the above parameters, the above parameters (except PL) can be obtained by means of pre-configuration or higher-layer signaling configuration. If $P_{S\text{-}PRS,D}$(i) is not preconfigured or configured by higher layer signaling, then $P_{S\text{-}PRS,D}(i)=P_{CMAX}$. If $P_{S\text{-}PRS,SL}$(i) is not preconfigured or configured by higher layer signaling, then $P_{S\text{-}PRS,SL}(i)=P_{CMAX}$. If $\alpha_D$ is not preconfigured or configured by higher layer signaling, then $\alpha_D=1$. If $\alpha_{SL}$ is not preconfigured or configured by higher layer signaling, then $\alpha_{SL}=1$.

Furthermore, the parameter CBR refers to a channel occupation ratio in a resource pool in a historical time window measured by the terminal, and is a characterization parameter of a congestion degree of a current resource pool. Different CBR value intervals correspond to different maximum transmission powers of the terminal. For example, a corresponding relationship between CBR and $P_{MAX,CBR}$ is shown in the following table:

| Serial number | Maximum transmission power $P_{MAX,\ CBR}$ of the terminal | CBR interval | CBR maximum transmission power $P_{MAX,\ CBR}$ of the terminal |
|---|---|---|---|
| 1 | 23 dBm | [CBR < 0.5] | 23 dBm |
| 2 | 23 dBm | [0.5 < CBR < 0.6] | 22 dBm |
| 3 | 23 dBm | [0.6 < CBR < 0.7] | 21 dBm |
| 4 | 23 dBm | [0.7 < CBR < 0.8] | 19 dBm |
| 5 | 23 dBm | [0.8 < CBR < 0.9] | 17 dBm |
| 6 | 23 dBm | [CBR > 0.9] | 15 dBm |

By adopting the power control method for the sidelink positioning reference signal in this embodiment, the terminal can flexibly determine the appropriate transmission power of the sidelink positioning reference signal according to respective parameters of the wireless transmission, CBR and the downlink path loss/sidelink path loss, reducing the mutual interference between the sidelink positioning reference signals sent between the terminals, and improving the positioning precision of the sidelink by the terminal.

Embodiment 5 (S-PRS power control scheme 5 (data channel determination method+different symbol transmission)) is as follows.

Transmission power $P_{S\text{-}PRS}$ of a sidelink positioning reference signal is determined according to information and maximum transmission power $P_{CMAX}$ of a sending terminal, a quantity M of resource blocks occupied by the sidelink positioning reference signal, transmission power $P_{PSSCH}$ of a sidelink physical sharing channel, or the like. The sending terminal sends the sidelink positioning reference signal (S-PRS) with the determined transmission power $P_{S\text{-}PRS}$.

The sending terminal determines the transmission power $P_{S\text{-}PRS}$(i) of the S-PRS in an S-PRS transmission occasion in slot i (i is an integer greater than or equal to 0) as:

$$P_{S\text{-}PRS}(i)=\min\left(P_{CMAX},\ 10\log_{10}\left(\frac{M_{RB}^{S\text{-}PRS}(i)}{M_{RB}^{PSSCH}(i)}\right)+P_{PSSCH}(i)\right)\text{ [dBm]};$$

where:

$$M_{RB}^{S\text{-}PRS}(i)$$

is a quantity of resource blocks used for S-PRS transmission in an S-PRS transmission occasion i;

$$M_{RB}^{PSSCH}(i)$$

is a quantity of resource blocks used for physical sidelink shared channel (PSSCH) transmission in a PSSCH transmission occasion i;

$P_{PSSCH}$(i) is transmission power $P_{PSSCH}$ of a sidelink data channel in a PSSCH transmission occasion i.

It should be noted that the S-PRS transmission power control scheme described in this embodiment is an indirect power control scheme, that is, the transmission power of the S-PRS is not calculated through various parameters of pre-configuration or high-level signaling configuration, but the transmission power of the S-PRS is indirectly obtained through the transmission power of the PSSCH data channel sent in the same time slot i, combined with the quantity of Resource blocks (RBs) occupied by the S-PRS and the PSSCH.

In this embodiment, it is assumed that although the S-PRS and the PSSCH are sent in the same time slot i, the S-PRS and the PSSCH do not occupy the same symbol. So the maximum possible transmission power of the S-PRS is $P_{CMAX}$.

By adopting the power control method for the sidelink positioning reference signal in this embodiment, the terminal can indirectly obtain the transmission power of the S-PRS according to the transmission power of the PSSCH data channel sent in the same time slot i, combined with the RB quantities occupied by the S-PRS and the PSSCH, reducing the mutual interference between the sidelink positioning reference signals sent between the terminals, and improving the positioning precision of the sidelink by the terminal. A large amount of power control parameters are not required to be acquired in advance, and signaling overhead is relatively small.

Embodiment 6 (S-PRS power control scheme 6 (data channel determination method+same symbol transmission)) is as follows.

Transmission power $P_{S\text{-}PRS}$ of a sidelink positioning reference signal is determined according to information and maximum transmission power $P_{CMAX}$ of a sending terminal, a quantity M of resource blocks occupied by the sidelink positioning reference signal, transmission power $P_{PSSCH}$ of a sidelink physical sharing channel, or the like. The sending terminal sends the sidelink positioning reference signal (S-PRS) with the determined transmission power $P_{S\text{-}PRS}$.

The sending terminal determines the transmission power $P_{S\text{-}PRS}$(i) of the S-PRS in an S-PRS transmission occasion in slot i (i is an integer greater than or equal to 0) as:

$$P_{S\text{-}PRS}(i)=\min\left(P_{CMAX}-P_{PSSCH}(i),\ 10\log_{10}\left(\frac{M_{RB}^{S\text{-}PRS}(i)}{M_{RB}^{PSSCH}(i)}\right)+P_{PSSCH}(i)\right)\text{ [dBm]};$$

where:

$$M_{RB}^{S\text{-}PRS}(i)$$

is a quantity of resource blocks used for S-PRS transmission in an S-PRS transmission occasion i;

$$M_{RB}^{PSSCH}(i)$$

is a quantity of resource blocks used for PSSCH transmission in a PSSCH transmission occasion i;

$P_{PSSCH}(i)$ is transmission power $P_{PSSCH}$ of a sidelink data channel in a PSSCH transmission occasion i.

It should be noted that the S-PRS transmission power control scheme described in this embodiment is an indirect power control scheme, that is, the transmission power of the S-PRS is not calculated through various parameters of pre-configuration or high-level signaling configuration, but the transmission power of the S-PRS is indirectly obtained through the transmission power of the PSSCH data channel sent in the same time slot i, combined with the quantity of Resource blocks (RBs) occupied by the S-PRS and the PSSCH.

In this embodiment, it is assumed that not only the S-PRS and the PSSCH are sent in the same time slot i, but also the S-PRS and the PSSCH occupy the same symbol, so the maximum possible transmission power of the S-PRS is $P_{CMAX}$-$P_{PSSCH}(i)$.

By adopting the power control method for the sidelink positioning reference signal in this embodiment, the terminal can indirectly obtain the transmission power of the S-PRS according to the transmission power of the PSSCH data channel sent in the same time slot i, combined with the RB quantities occupied by the S-PRS and the PSSCH, reducing the mutual interference between the sidelink positioning reference signals sent between the terminals, and improving the positioning precision of the sidelink by the terminal. A large amount of power control parameters are not required to be acquired in advance, and signaling overhead is relatively small.

Embodiment 7 (multiplexing scheme of S-PRS and PSSCH/PSCCH/PSFCH) is as follows.

For a multiplexing condition of the S-PRS and the PSSCH data channel, a sending terminal selects and uses a suitable S-PRS power control scheme according to the multiplexing condition of the same symbol of the S-PRS and the PSSCH.

When the S-PRS and the PSSCH are not sent on the same symbol, the sending terminal uses the above S-PRS power control schemes 1 to 5, to perform transmission power control on the S-PRS.

When the S-PRS and the PSSCH are sent on the same symbol, the sending terminal uses the above S-PRS power control scheme 6, to perform transmission power control on the S-PRS.

The above S-PRS power control selection schemes are used because the S-PRS may be sent on the same symbol as the PSSCH for frequency division multiplexing, and the S-PRS may also be sent on different symbols from the PSSCH for time division multiplexing. If the S-PRS and the PSSCH are not sent on the same symbol, the maximum transmission power of the S-PRS is $P_{CMAX}$. If the S-PRS and the PSSCH are sent on the same symbol, the maximum transmission power of the S-PRS is $P_{CMAX}$-$P_{PSSCH}(i)$.

Regarding the multiplexing condition of S-PRS and control channels and PSCCH/PSFCH, in order to avoid the influence of S-PRS on the control channel of the sidelink, S-PRS and at least one channel and PSCCH and PSFCH are not sent on the same symbol. In this way, the S-PRS transmission can be prevented from occupying the power of the control channel, and the interference to the control channel can also be avoided.

By adopting the multiplexing scheme of the S-PRS and channels and PSSCH/PSCCH/PSFCH described in this embodiment, a suitable multiplexing scheme can be flexibly selected according to different types of sidelink channels, which can not only ensure the S-PRS has enough time-frequency resources to use, but also ensure the transmission success rate of the control channel.

Figure 3:
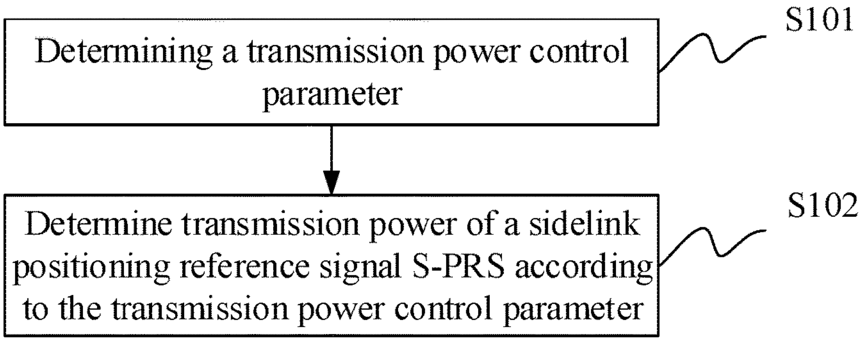
FIG. 3 is a schematic flow chart of a method for controlling signal transmission power at a sending terminal side according to an embodiment of the present disclosure.

To sum up, referring to FIG. 3, at a sending terminal side, a method for controlling signal transmission power according to an embodiment of the present disclosure includes following steps.

S101, determining a transmission power control parameter.

S102, determine transmission power of a sidelink positioning reference signal S-PRS according to the transmission power control parameter.

In one embodiment, the transmission power control parameter includes one or a combination of following parameters:

- the maximum transmission power of a sending terminal;
- a power control configuration parameter of the sidelink positioning reference signal;
- a partial path loss compensation factor of the sidelink positioning reference signal;
- a quantity of resource blocks occupied by the sidelink positioning reference signal;
- a sidelink path loss;
- a downlink path loss;
- an uplink path loss;
- a channel busy ratio;
- a transmission power of a physical sidelink shared channel.

Optionally (corresponding to the above scheme 1), determining the transmission power of the S-PRS according to the transmission power control parameter, includes:

determining the transmission power $P_{S\text{-}PRS}(i)$ of the S-PRS in an S-PRS transmission occasion in slot i (i is an integer greater than or equal to 0) as:

$$P_{S-PRS}(i) = \min\left(P_{CMAX},\ P_{O,S-PRS} + 10\log_{10}\left(2^{\mu}\cdot M_{RB}^{S-PRS}\right) + \alpha_{S-PRS}\cdot PL\right)\ [\text{dBm}];$$

where:

$P_{CMAX}$ is maximum transmission power of a sending terminal;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-ARB PRS;

$\alpha_{S\text{-}PRS}$ is a partial path loss compensation factor of the S-PRS;

PL is any one path loss of a sidelink path loss, a downlink path loss and an uplink path loss, or is a function value with at least one path loss of the sidelink path loss, the downlink path loss or the uplink path loss as an independent variable.

Optionally (corresponding to the above scheme 2), determining the transmission power of the S-PRS according to the transmission power control parameter, includes:

determining the transmission power $P_{S\text{-}PRS}(i)$ of the S-PRS in an S-PRS transmission occasion in slot i as:

$$P_{S-PRS}(i) = \min\left(P_{CMAX},\ P_{MAX,CBR},\ P_{O,S-PRS} + 10\log_{10}\left(2^{\mu}\cdot M_{RB}^{S-PRS}\right) + \alpha_{S-PRS}\cdot PL\right)\ [\text{dBm}];$$

where:

$P_{CMAX}$ is maximum transmission power of a sending terminal;

$P_{MAX,CBR}$ is the maximum transmission power of the sending terminal related to a channel busy ratio, CBR;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_{S\text{-}PRS}$ is a partial path loss compensation factor of the S-PRS;

PL is any one path loss of a sidelink path loss, a downlink path loss and an uplink path loss, or is a function value with at least one path loss of the sidelink path loss, the downlink path loss or the uplink path loss as an independent variable.

Optionally (corresponding to the above scheme 3), determining the transmission power of the S-PRS according to the transmission power control parameter, includes:

determining the transmission power $P_{S\text{-}PRS}(i)$ of the S-PRS in an S-PRS transmission occasion in slot i as:

$$P_{S\text{-}PRS}(i)=\min(P_{CMAX},\ \min(P_{S\text{-}PRS,D}(i),P_{S\text{-}PRS,SL}\ ([dBm];$$

where:

$P_{CMAX}$ is maximum transmission power of a sending terminal;

$P_{S\text{-}PRS,D}(i)$ is the transmission power of the S-PRS in an S-PRS transmission occasion in slot i determined by the sending terminal according to a downlink path loss;

$P_{S\text{-}PRS,SL}(i)$ is the transmission power of the S-PRS in an S-PRS transmission occasion in slot i determined by the sending terminal according to a sidelink path loss.

Optionally (corresponding to the above scheme 4), determining the transmission power of the S-PRS according to the transmission power control parameter, includes:

determining the transmission power $P_{S\text{-}PRS}(i)$ of the S-PRS in an S-PRS transmission occasion in slot i as:

$$P_{S\text{-}PRS}(i)=\min(P_{CMAX},P_{MAX,CBR},\quad \min(P_{S\text{-}PRS,D}(i),\ P_{S\text{-}PRS,SL}(i))[dBm];$$

where:

$P_{CMAX}$ is maximum transmission power of a sending terminal;

$P_{MAX,CBR}$ is the maximum transmission power of the sending terminal related to a channel busy ratio, CBR;

$P_{S\text{-}PRS,D}(i)$ is the transmission power of the S-PRS in an S-PRS transmission occasion in slot i determined by the sending terminal according to a downlink path loss;

$P_{S\text{-}PRS,SL}(i)$ is the transmission power of the S-PRS in an S-PRS transmission occasion in slot i determined by the sending terminal according to a sidelink path loss.

In one embodiment, $P_{S\text{-}PRS,D}(i)$ is determined by:

$$P_{S-PRS,D}(i) = P_{O,D} + 10\log_{10}\left(2^{\mu}\cdot M_{RB}^{S-PRS}(i)\right) + \alpha_{D}\cdot PL_{D}\ [\text{dBm}];$$

where:

$P_{O,D}$ is a power control parameter $P_0$ related to downlink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S-PRS}$$

is a quantity of resource blocks used by the sending terminal when sending the S-PRS;

$\alpha_D$ is a partial path loss compensation factor related to downlink for the S-PRS;

$PL_D$ is a downlink path loss $PL_{DL}$.

In one embodiment, $P_{S\text{-}PRS,SL}(i)$ is determined by:

$$P_{S-PRS,SL}(i) = P_{O,SL} + 10\log_{10}\left(2^{\mu}\cdot M_{RB}^{S-PRS}(i)\right) + \alpha_{SL}\cdot PL_{SL}\ [\text{dBm}];$$

where:

$P_{O,SL}$ is a power control parameter $P_0$ related to sidelink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_{SL}$ is a partial path loss compensation factor related to sidelink for the S-PRS;

$PL_{SL}$ is a sidelink path loss.

Optionally (corresponding to the above scheme 5), determining the transmission power of the S-PRS according to the transmission power control parameter, includes:

determining the transmission power $P_{S\text{-}PRS}(i)$ of the S-PRS in an S-PRS transmission occasion in slot i (i is an integer greater than or equal to 0) as:

$$P_{S-PRS}(i) = \min\left(P_{CMAX},\ 10\log_{10}\left(\frac{M_{RB}^{S-PRS}(i)}{M_{RB}^{PSSCH}(i)}\right) + P_{PSSCH}(i)\right)\ [\text{dBm}];$$

where:

$$M_{RB}^{S\text{-}PRS}(i)$$

is a quantity of resource blocks used for S-PRS transmission in an S-PRS transmission occasion i;

$$M_{RB}^{PSSCH}(i)$$

is a quantity of resource blocks used for physical sidelink shared channel, PSSCH, transmission in a PSSCH transmission occasion i;

$P_{PSSCH}(i)$ is transmission power $P_{PSSCH}$ of a sidelink data channel in a PSSCH transmission occasion i.

Optionally (multiplexing condition of using the above schemes 1-5), the S-PRS and the physical sidelink share channel, PSSCH, are not sent on a same symbol.

Optionally (corresponding to the above scheme 6), determining the transmission power of the S-PRS according to the transmission power control parameter, includes:

determining the transmission power $P_{S\text{-}PRS}(i)$ of the S-PRS in an S-PRS transmission occasion in slot i (i is an integer greater than or equal to 0) as:

$$P_{S-PRS}(i) = \min\left(P_{CMAX} - P_{PSSCH}(i),\ 10\log_{10}\left(\frac{M_{RB}^{S-PRS}(i)}{M_{RB}^{PSSCH}(i)}\right) + P_{PSSCH}(i)\right)\ [\text{dBm}];$$

where:

$$M_{RB}^{S\text{-}PRS}(i)$$

is a quantity of resource blocks used for S-PRS transmission in an S-PRS transmission occasion i;

$$M_{RB}^{PSSCH}(i)$$

is a quantity of resource blocks used for PSSCH transmission in a PSSCH transmission occasion i;

$P_{PSSCH}(i)$ is transmission power $P_{PSSCH}$ of a sidelink data channel in a PSSCH transmission occasion i.

Optionally (multiplexing condition of using the above scheme 6), the S-PRS and the physical sidelink share channel, PSSCH, are sent on a same symbol.

In one embodiment, the S-PRS is not sent on a same symbol as at least one of a physical sidelink control channel, PSCCH, or a physical sidelink feedback channel PSFCH.

Figure 4:
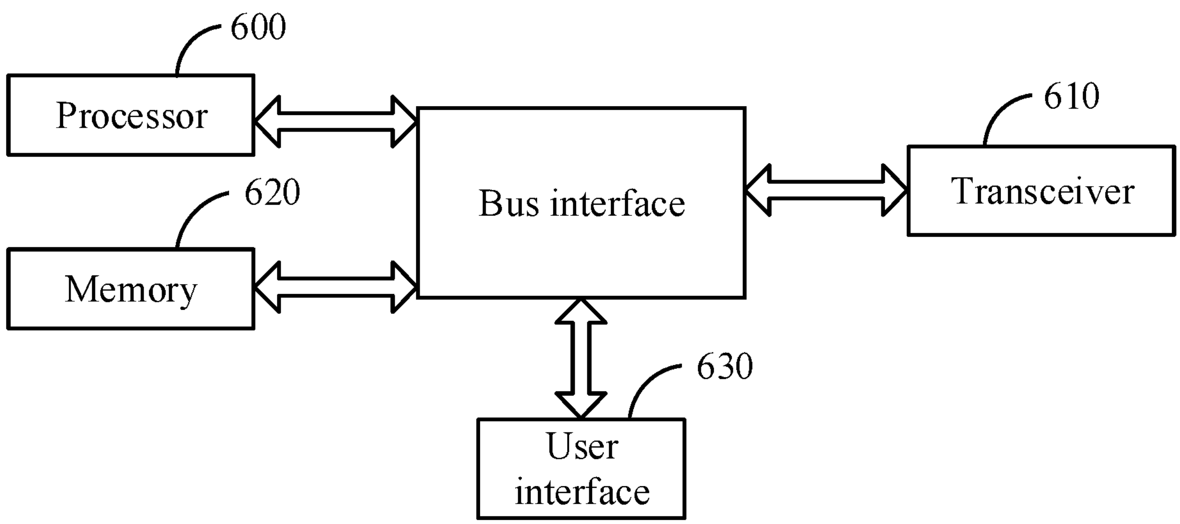
FIG. 4 is a schematic structural diagram of an apparatus for controlling signal transmission power according to an embodiment of the present disclosure.

Referring to FIG. 4, at a sending terminal side, an apparatus for controlling signal transmission power according to an embodiment of the present disclosure includes:

a memory 620, configured to store program instructions;

a processor 600, configured to invoke the program instructions stored in the memory and perform according to an obtained program:

determining a transmission power control parameter;

determining transmission power of a sidelink positioning reference signal, S-PRS, according to the transmission power control parameter.

In one embodiment, the transmission power control parameter includes one or a combination of following parameters:

the maximum transmission power of a sending terminal;

a power control configuration parameter of the sidelink positioning reference signal;

a partial path loss compensation factor of the sidelink positioning reference signal;

a quantity of resource blocks occupied by the sidelink positioning reference signal;

a sidelink path loss;

a downlink path loss;

an uplink path loss;

a channel busy ratio;

a transmission power of a physical sidelink shared channel.

In one embodiment, the processor 600 is configured to perform:

determining the transmission power $P_{S\text{-}PRS}(i)$ of the S-PRS in an S-PRS transmission occasion in slot i (i is an integer greater than or equal to 0) as:

$$P_{S-PRS}(i) = \min\left(P_{CMAX},\ P_{O,S-PRS} + 10\log_{10}\left(2^{\mu} \cdot M_{RB}^{S-PRS}\right) + \alpha_{S-PRS} \cdot PL\right)\ [\text{dBm}];$$

where:

$P_{CMAX}$ is maximum transmission power of a sending terminal;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_{S\text{-}PRS}$ is a partial path loss compensation factor of the S-PRS;

PL is any one path loss of a sidelink path loss, a downlink path loss and an uplink path loss, or is a function value with at least one path loss of the sidelink path loss, the downlink path loss or the uplink path loss as an independent variable.

In one embodiment, the processor 600 is configured to perform:

determining the transmission power $P_{S\text{-}PRS}(i)$ of the S-PRS in an S-PRS transmission occasion in slot i as:

$$P_{S-PRS}(i) = \min\left(P_{CMAX},\ P_{MAX,CBR},\ P_{O,S-PRS} + 10\log_{10}\left(2^{\mu} \cdot M_{RB}^{S-PRS}\right) + \alpha_{S-PRS} \cdot PL\right)\ [\text{dBm}];$$

where:

$P_{CMAX}$ is maximum transmission power of a sending terminal;

$P_{MAX,CBR}$ is the maximum transmission power of the sending terminal related to a channel busy ratio, CBR;

$P_{O,S\text{-}PRS}$ is a power control configuration parameter $P_0$ of the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_{S\text{-}PRS}$ is a partial path loss compensation factor of the S-PRS;

PL is any one path loss of a sidelink path loss, a downlink path loss and an uplink path loss, or is a function value with at least one path loss of the sidelink path loss, the downlink path loss or the uplink path loss as an independent variable.

In one embodiment, the processor 600 is configured to perform:

determining the transmission power $P_{S\text{-}PRS}(i)$ of the S-PRS in an S-PRS transmission occasion in slot i as:

$$P_{S\text{-}PRS}(i)=\min(P_{CMAX},\ \min(P_{S\text{-}PRS,D}(i),P_{S\text{-}PRS,SL}(i)\ [dBm];$$

where:

$P_{CMAX}$ is maximum transmission power of a sending terminal;

$P_{S\text{-}PRS,D}(i)$ is the transmission power of the S-PRS in an S-PRS transmission occasion in slot i determined by the sending terminal according to a downlink path loss;

$P_{S\text{-}PRS,SL}(i)$ is the transmission power of the S-PRS in an S-PRS transmission occasion in slot i determined by the sending terminal according to a sidelink path loss.

In one embodiment, the processor 600 is configured to perform:

determining the transmission power $P_{S\text{-}PRS}(i)$ of the S-PRS in an S-PRS transmission occasion in slot i as:

$$P_{S\text{-}PRS}(1)=\min(P_{CMAX},P_{MAX,CBR},\ \min(P_{S\text{-}PRS,D}(i),\ P_{S\text{-}PRS,SL}(i))[dBm];$$

where:

$P_{CMAX}$ is maximum transmission power of a sending terminal;

$P_{MAX,CBR}$ is the maximum transmission power of the sending terminal related to a channel busy ratio, CBR;

$P_{S\text{-}PRS,D}(i)$ is the transmission power of the S-PRS in an S-PRS transmission occasion in slot i determined by the sending terminal according to a downlink path loss;

$P_{S\text{-}PRS,SL}(i)$ is the transmission power of the S-PRS in an S-PRS transmission occasion in slot i determined by the sending terminal according to a sidelink path loss.

In one embodiment, the processor 600 is configured to determine $P_{S\text{-}PRS,D}(i)$ by:

$$P_{S-PRS,D}(i) = P_{O,D} + 10\log_{10}\left(2^{\mu}\cdot M_{RB}^{S-PRS}(i)\right) + \alpha_D\cdot PL_D\ [\text{dBm}];$$

where:

$P_{O,D}$ is a power control parameter $P_0$ related to downlink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_D$ is a partial path loss compensation factor related to downlink for the S-PRS;

$PL_D$ is a downlink path loss $PL_{DL}$.

In one embodiment, $P_{S\text{-}PRS,SL}(i)$ is determined by:

$$P_{S-PRS,SL}(i) = P_{O,SL} + 10\log_{10}\left(2^{\mu}\cdot M_{RB}^{S-PRS}(i)\right) + \alpha_{SL}\cdot PL_{SL}[\text{dBm}];$$

where:

$P_{O,SL}$ is a power control parameter $P_0$ related to sidelink for the S-PRS;

μ is a parameter related to a subcarrier interval used by the sending terminal when sending the S-PRS; when the subcarrier interval is 15, 30, 60 and 120 KHz respectively, μ is equal to 0, 1, 2 and 3 respectively;

$$M_{RB}^{S\text{-}PRS}$$

is a quantity of resource blocks used by the sending terminal when sending the S-PRS;

$\alpha_{SL}$ is a partial path loss compensation factor related to sidelink for the S-PRS;

$PL_{SL}$ is a sidelink path loss.

In one embodiment, the processor 600 is configured to perform:

determining the transmission power $P_{S\text{-}PRS}(i)$ of the S-PRS in an S-PRS transmission occasion in slot i as:

$$P_{S-PRS}(i) = \min\left(P_{CMAX},\ 10\log_{10}\left(\frac{M_{RB}^{S-PRS}(i)}{M_{RB}^{PSSCH}(i)}\right) + P_{PSSCH}(i)\right)[\text{dBm}];$$

where:

$$M_{RB}^{S-PRS}(i)$$

is a quantity of resource blocks used for S-PRS transmission in an S-PRS transmission occasion i;

$$M_{RB}^{PSSCH}(i)$$

is a quantity of resource blocks used for physical sidelink shared channel, PSSCH, transmission in a PSSCH transmission occasion i;

$P_{PSSCH}(i)$ is transmission power $P_{PSSCH}$ of a sidelink data channel in a PSSCH transmission occasion i.

In one embodiment, the S-PRS and the physical sidelink share channel, PSSCH, are not sent on a same symbol.

In one embodiment, the processor 600 is configured to perform:

determining the transmission power $P_{S\text{-}PRS}(i)$ of the S-PRS in an S-PRS transmission occasion in slot i as:

$$P_{S-PRS}(i) = \min\left(P_{CMAX} - P_{PSSCH}(i),\ 10\log_{10}\left(\frac{M_{RB}^{S-PRS}(i)}{M_{RB}^{PSSCH}(i)}\right) + P_{PSSCH}(i)\right)[\text{dBm}];$$

where:

$$M_{RB}^{S-PRS}(i)$$

is a quantity of resource blocks used for S-PRS transmission in an S-PRS transmission occasion i;

$$M_{RB}^{PSSCH}(i)$$

is a quantity of resource blocks used for PSSCH transmission in a PSSCH transmission occasion i;

$P_{PSSCH}(i)$ is transmission power $P_{PSSCH}$ of a sidelink data channel in a PSSCH transmission occasion i.

In one embodiment, the S-PRS and the physical sidelink share channel, PSSCH, are sent on a same symbol.

In one embodiment, the S-PRS is not sent on a same symbol as at least one of a physical sidelink control channel, PSCCH, or a physical sidelink feedback channel PSFCH.

In one embodiment, the processor 600 is configured to call the program instructions stored in the memory and perform according to an obtained program:

receiving a sidelink positioning reference signal, S-PRS, transmitted between a sending terminal and a receiving terminal;

measuring the S-PRS, and sending a measurement result to the sending terminal to assist the sending terminal to perform positioning.

A transceiver 610 is configured to receive and send data under control of the processor 600.

In FIG. 4, a bus architecture may include any quantity of interconnected buses and bridges, which are linked together by one or more processors represented by the processor 600 and various circuits of the memory represented by the memory 600. The bus architecture may further link various other circuits, and a peripheral device, a voltage regulator, and a power management circuit, which are well known in the art and therefore are not further described herein. The bus interface provides an interface. Transceiver 610 may be a plurality of components, namely, the transceiver may include a transmitter and a receiver, and provide a unit configured to be in communication with various other devices over a transmission medium. For different user devices, the user interface 630 may also be an interface capable of connecting external and internal required devices, connected devices include, but are not limited to, a keypad, a display, a speaker, a microphone, a joystick, etc.

The processor 600 is responsible for managing the bus architecture and general processing, and the memory 620 may store data used by the processor 600 during performing operations.

The processor 600 may be a central processing unit (CPU), an application specific integrated circuit (ASIC), a field-programmable gate array (FPGA) or a complex programmable logic device (CPLD).

Figure 5:
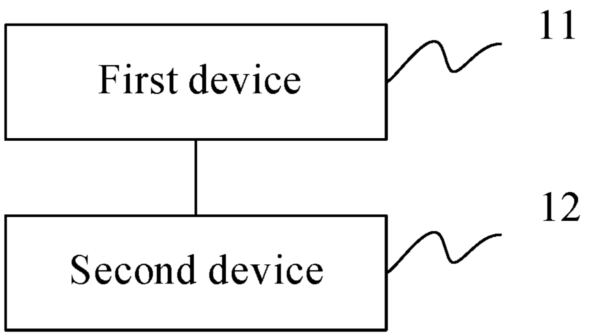
FIG. 5 is a schematic structural diagram of an apparatus for controlling signal transmission power at a sending terminal side according to an embodiment of the present disclosure.

Referring to FIG. 5, at a sending terminal side, an apparatus for controlling signal transmission power according to an embodiment of the present disclosure includes:

a first device, configured to determine transmission power control parameter;

a second device, configured to determine transmission power of a sidelink positioning reference signal, S-PRS, according to the transmission power control parameter.

It should be noted that the above-mentioned second device 12 can determine the transmission power of the S-PRS according to the process described in the above method, and the details are not repeated.

The apparatus described in embodiments of the present disclosure may a sending terminal or a receiving terminal, and may have functions of both the sending terminal and the receiving terminal.

It should be noted that the division of units in embodiments of the present disclosure is illustrative, and is only a logical function division, and other division methods may be used in actual implementation. In addition, each functional unit in embodiments of the present disclosure may be integrated into one processing unit, or each unit may exist physically separately, or two or more units may be integrated into one unit. The above-mentioned integrated units may be implemented in the form of hardware, or may be implemented in the form of software functional units.

The integrated unit may be stored in a computer-readable storage medium if the integrated unit is implemented in the form of a software functional unit and sold or used as an independent product. Based on this understanding, embodiments of the present disclosure can be embodied in the form of software products in essence, or the parts that contribute to the prior art, or all or part of the embodiments, and the computer software products are stored in a storage medium, including several instructions for causing a computer device (which may be a personal computer, a server, or a network device, etc.) or a processor to execute all or part of the steps of the methods described in various embodiments of the present disclosure. The aforementioned storage medium includes: a U disk, a mobile hard disk, a read-only memory (ROM), a random access memory (RAM), a magnetic disk or an optical disk and other media that can store program codes.

Embodiments of the present disclosure provide a computing device, and the computing device may be a desktop computer, a portable computer, a smart phone, a tablet computer, a personal digital assistant (PDA), and the like. The computing device may include a central processing unit (CPU), a memory, an input/output device, etc., the input device may include a keyboard, a mouse, a touch screen, etc., and the output device may include a display device, and a liquid crystal display (LCD), a cathode ray tube (CRT), etc.

The memory may include a read only memory (ROM) and a random access memory (RAM) and provide a processor with program instructions and data stored in the memory. In embodiments of the present disclosure, the memory may be used to store the program of any of the methods provided in embodiments of the present disclosure.

The processor invokes the program instructions stored in the memory, and the processor is configured to execute any one of the methods according to embodiments of the present disclosure according to the obtained program instructions.

Embodiments of the present disclosure provide a computer storage medium for storing computer program instructions used for the apparatuses according to embodiments of the present disclosure, which includes a program for executing any of the methods according to embodiments of the present disclosure.

The computer storage medium can be any available medium or data storage device that can be accessed by a computer, including but not limited to the magnetic storage (e.g. a floppy disk, a hard disk, a magnetic tape, a magneto-optical disk (MO), etc.), an optical storage (such a CD, a DVD, a BD, an HVD, etc.), as well as a semiconductor memory (e.g. ROM, EPROM, EEPROM, a non-volatile memory (NAND FLASH), a solid-state disk (SSD)), and the like.

The methods provided in embodiments of the present disclosure may be applied to the terminal device, and may also be applied to the network device.

The terminal device may also be referred to as user equipment (UE for short), a mobile station (MS for short), a mobile terminal, etc. In one embodiment, the terminal may have the ability to communicate with one or more core networks via a radio access network (RAN), for example, the terminal may be a mobile phone (or a "cellular" phone), or a computer with a mobile nature, etc., for example, the terminal may also be a portable mobile device, a pocket-sized mobile device, a hand-held mobile device, a computer-built mobile device, or a vehicle-mounted mobile device.

The network device, which may be a base station (e.g. an access point), refers to a device in an access network that communicates with wireless terminals over an air interface through one or more sectors. The base station may be configured to interconvert received air frames and internet protocol (IP) packets, and act as a router between the wireless terminal and the rest of the access network, where the rest of the access network may include an internet protocol (IP) network. The base station may also coordinate attribute management of the air interface. For example, the base station may be a base transceiver station (BTS) in GSM or CDMA, or a NodeB in WCDMA, or an evolutional Node (NodeB or eNB or e-NodeB,) in the LTE, or a gNB in the 5G system, etc., which is not limited in embodiments of the present disclosure.

The processing flow of the above method can be implemented by a software program, and the software program can be stored in a storage medium, and when the stored software program is invoked, the above method steps are executed.

Embodiments of the present disclosure can be provided as methods, systems or computer program products. Therefore, the present disclosure can adopt forms of full hardware embodiments, full software embodiments, or embodiments combining software and hardware aspects. Moreover, the present disclosure can adopt a form of the computer program products implemented on one or more computer available storage mediums (including but not limited to a disk memory, an optical memory and the like) containing computer available program codes.

The present disclosure is described with reference to flow charts and/or block diagrams of the methods, the devices (systems), and the computer program products according to embodiments of the present disclosure. It should be understood that each flow and/or block in the flow charts and/or the block diagrams and combinations of the flows and/or the blocks in the flow charts and/or the block diagrams can be implemented by computer program instructions. The computer program instructions may be provided to a processor of a general-purpose computer, a special-purpose computer, an embedded processing machine or other programmable data processing device, to generate a machine, and the instructions, when executed by the processor of the computers or other programmable data processing device, generate devices for implementing functions specified in one or more flows in the flow charts and/or one or more blocks in the block diagrams.

The computer program instructions may also be stored in a computer readable memory which can guide the computers or other programmable data processing device to work in a specific mode, thus the instructions stored in the computer readable memory generates an article of manufacture that includes a commander device that implement the functions specified in one or more flows in the flow charts and/or one or more blocks in the block diagrams.

The computer program instructions may also be loaded to the computers or other programmable data processing device, and a series of operating steps may be executed on the computers or other programmable device to generate computer-implemented processing, and the instructions executed on the computers or other programmable device provide steps for implementing the functions specified in one or more flows in the flow charts and/or one or more blocks in the block diagrams.

What is claimed is:

1. A method for controlling signal transmission power, comprising:

determining a transmission power control parameter;

determining transmission power of a sidelink positioning reference signal, S-PRS, according to the transmission power control parameter;

wherein the determining the transmission power of the S-PRS according to the transmission power control parameter, comprises:

determining the transmission power $P_{S\text{-}PRS}(i)$ of the S-PRS in an S-PRS transmission occasion in slot i as:

$$P_{S\text{-}PRS}(i)=\min(P_{CMAX},P_{MAX,CBR},\quad \min(P_{S\text{-}PRS,D}(i),P_{S\text{-}PRS,SL}(i))[dBm];$$

wherein:

$P_{CMAX}$ is a maximum transmission power of a sending terminal;

$P_{MAX,CBR}$ is a maximum transmission power of the sending terminal related to a channel busy ratio, CBR;

$P_{S\text{-}PRS,D}(i)$ is a transmission power of the S-PRS in an S-PRS transmission occasion in slot i determined by the sending terminal according to a downlink path loss;

$P_{S\text{-}PRS,SL}(i)$ is a transmission power of the S-PRS in an S-PRS transmission occasion in slot i determined by the sending terminal according to a sidelink path loss;

i is an integer greater than or equal to 0.

2. The method according to claim 1, wherein the S-PRS is not sent on a symbol same as a symbol at which at least one of a physical sidelink control channel, PSCCH, or a physical sidelink feedback channel PSFCH is sent.

3. An apparatus for controlling signal transmission power, comprising:

a memory, configured to store program instructions;

a processor, configured to invoke the program instructions stored in the memory, and perform followings according to an obtained program:

determining a transmission power control parameter;

determining a transmission power of a sidelink positioning reference signal, S-PRS, according to the transmission power control parameter;

wherein the processor is configured to perform followings:

determining the transmission power $P_{S-PRS}(i)$ of the S-PRS in an S-PRS transmission occasion in slot i as:

$$P_{S-PRS}(i)=\min(P_{CMAX},P_{MAX,CBR},\ \min(P_{S-PRS,D}(i),P_{S-PRS,SL}(i))[dBm];$$

wherein:

$P_{CMAX}$ is a maximum transmission power of a sending terminal:

$P_{MAX,CBR}$ is a maximum transmission power of the sending terminal related to a channel busy ratio, CBR;

$P_{S-PRS,D}(i)$ is a transmission power of the S-PRS in an S-PRS transmission occasion in slot i determined by the sending terminal according to a downlink path loss;

$P_{S-PRS,SL}(i)$ is a transmission power of the S-PRS in an S-PRS transmission occasion in slot i determined by the sending terminal according to a sidelink path loss;

i is an integer greater than or equal to 0.

4. The apparatus according to claim 3, wherein the S-PRS is not sent on a symbol same as a symbol in which at least one of a physical sidelink control channel, PSCCH, or a physical sidelink feedback channel PSFCH is sent.

* * * * *